US012771040B2

(12) United States Patent
Shih et al.

(10) Patent No.: US 12,771,040 B2
(45) Date of Patent: Oct. 20, 2026

(54) ANTENNA STRUCTURE AND BLUETOOTH ANTENNA

(71) Applicant: Wistron NeWeb Corp., Hsinchu (TW)

(72) Inventors: Shih-Ping Shih, Hsinchu (TW); Tzu-Hsuan Hsu, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 56 days.

(21) Appl. No.: 19/009,156

(22) Filed: Jan. 3, 2025

(65) Prior Publication Data

US 2025/0266619 A1 Aug. 21, 2025

(30) Foreign Application Priority Data

Feb. 20, 2024 (TW) ................................ 113105963

(51) Int. Cl.

| | |
|---|---|
| ***H01Q 5/378*** | (2015.01) |
| ***H01Q 1/48*** | (2006.01) |
| ***H01Q 13/20*** | (2006.01) |
| *H01Q 1/24* | (2006.01) |

(52) U.S. Cl.

CPC ............... *H01Q 13/20* (2013.01); *H01Q 1/24* (2013.01)

(58) Field of Classification Search

CPC ............ H01Q 1/48; H01Q 13/20; H01Q 1/24; H01Q 5/378; H01Q 1/243; H01Q 5/335; H01Q 5/321; H01Q 1/38; H01Q 1/22; H01Q 13/10; H01Q 5/364; H01Q 5/371; H01Q 9/0414; H01Q 9/0421; H01Q 1/2266; H01Q 5/328; H01Q 1/526; H01Q 5/385; H01Q 9/42; H01Q 1/2291; H01Q 9/40; H01Q 9/30; H01Q 9/285

See application file for complete search history.

(56) References Cited

U.S. PATENT DOCUMENTS

| | | | | |
|---|---|---|---|---|
| 10,454,156 | B1 * | 10/2019 | Yang | H01Q 1/48 |
| 12,394,899 | B2 * | 8/2025 | Lee | H01Q 1/2266 |
| 2021/0249766 | A1 * | 8/2021 | Wu | H01Q 5/48 |

FOREIGN PATENT DOCUMENTS

| | | |
|---|---|---|
| TW | 202002403 A | 1/2020 |
| TW | 202327166 A | 7/2023 |

* cited by examiner

*Primary Examiner* — Dameon E Levi
*Assistant Examiner* — Gurbir Singh
(74) *Attorney, Agent, or Firm* — McClure, Qualey & Rodack, LLP

(57) ABSTRACT

An antenna structure includes a main radiation element, a first ground element, a second ground element, a carrier element, a metal cavity, a first capacitor, and a second capacitor. The first ground element includes a first connection segment, a first protruding segment, and a second protruding segment. The second ground element includes a second connection segment, a third protruding segment, and a fourth protruding segment. The main radiation element is surrounded by the first ground element and the second ground element. The first capacitor is coupled between the first protruding segment and the third protruding segment. The second capacitor is coupled between the second protruding segment and the fourth protruding segment. The metal cavity is coupled to the first connection segment and the second connection segment. The carrier element is disposed in the metal cavity.

19 Claims, 5 Drawing Sheets

ANTENNA STRUCTURE AND BLUETOOTH ANTENNA

CROSS REFERENCE TO RELATED APPLICATIONS

This application claims priority of Taiwan Patent Application No. 113105963 filed on Feb. 20, 2024, the entirety of which is incorporated by reference herein.

BACKGROUND OF THE DISCLOSURE

Field of the Disclosure

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna structure.

BRIEF SUMMARY OF THE DISCLOSURE

In an exemplary embodiment, the disclosure is directed to an antenna structure that includes a main radiation element, a first ground element, a second ground element, a first capacitor, a second capacitor, a metal cavity, and a carrier element. The main radiation element has a feeding point. The first ground element includes a first connection segment, a first protruding segment, and a second protruding segment. The second ground element includes a second connection segment, a third protruding segment, and a fourth protruding segment. The main radiation element is coupled to the second ground element. The main radiation element is surrounded by the first ground element and the second ground element. The first capacitor is coupled between the first protruding segment and the third protruding segment. The second capacitor is coupled between the second protruding segment and the fourth protruding segment. The metal cavity is coupled to the first connection segment and the second connection segment. The carrier element is disposed in the metal cavity. The carrier element is configured to carry the main radiation element, the first protruding segment, the second protruding segment, the third protruding segment, the fourth protruding segment, the first capacitor, and the second capacitor.

In another exemplary embodiment, the disclosure is directed to a Bluetooth antenna that includes a main radiation element, a first ground element, a second ground element, a first capacitor, a second capacitor, and a metal cavity. The main radiation element has a feeding point. The first ground element includes a first connection segment, a first protruding segment, and a second protruding segment. The second ground element includes a second connection segment, a third protruding segment, and a fourth protruding segment. The main radiation element is coupled to the second ground element. The main radiation element is surrounded by the first ground element and the second ground element. The first capacitor is coupled between the first protruding segment and the third protruding segment. The second capacitor is coupled between the second protruding segment and the fourth protruding segment. The metal cavity is coupled to the first connection segment and the second connection segment.

BRIEF DESCRIPTION OF DRAWINGS

The disclosure can be more fully understood by reading the subsequent detailed description and examples with references made to the accompanying drawings, wherein.

DETAILED DESCRIPTION OF THE DISCLOSURE

Figure 1:
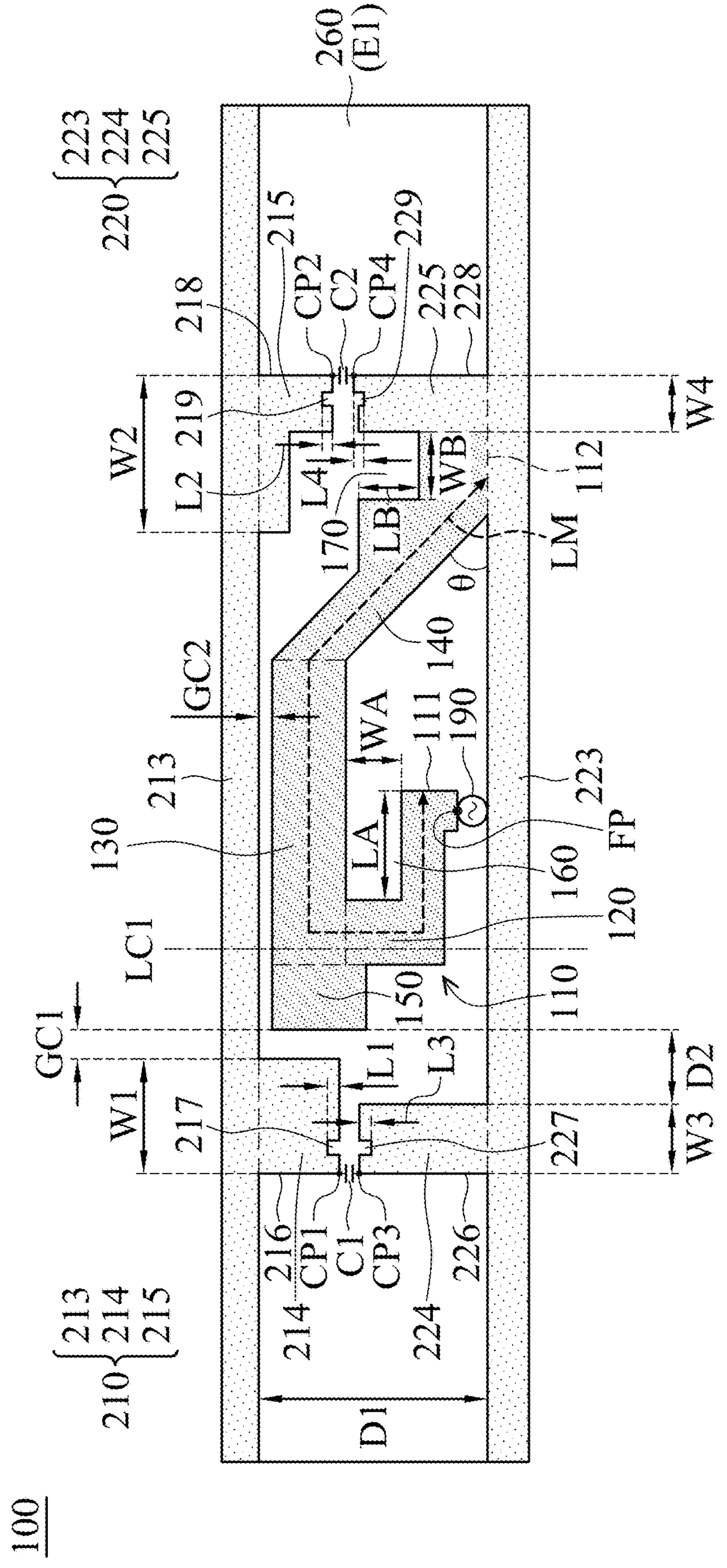
FIG. 1 is a top view of an antenna structure according to an embodiment of the disclosure.

In order to illustrate the purposes, features and advantages of the disclosure, the embodiments and figures of the disclosure are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
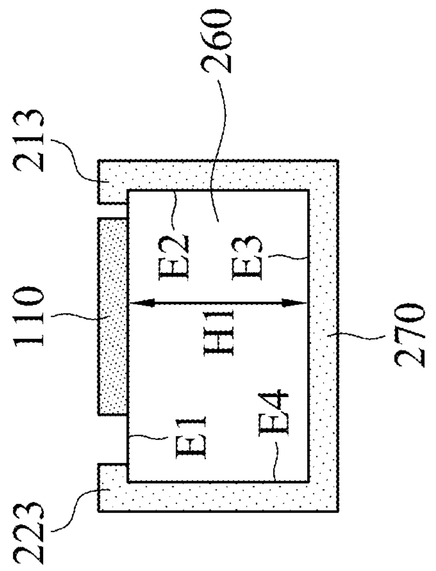
FIG. 2 is a sectional view of an antenna structure according to an embodiment of the disclosure.

FIG. 1 is a top view of an antenna structure 100 according to an embodiment of the disclosure. FIG. 2 is a sectional view of the antenna structure 100 according to an embodiment of the disclosure (along a sectional line LC1 of FIG. 1). Please refer to FIG. 1 and FIG. 2 together. The antenna structure 100 may be applied to a mobile device, such as a smart phone, a tablet computer, or a notebook computer. In the embodiment of FIG. 1 and FIG. 2, the antenna structure 100 includes a main radiation element 110, a first ground element 210, a second ground element 220, a carrier element 260, a metal cavity 270, a first capacitor C1, and a second capacitor C2. The main radiation element 110, the first ground element 210, and the second ground element 220 may all be made of metal materials, such as copper, silver, aluminum, iron, or their alloys.

The first ground element 210 includes a first connection segment 213, a first protruding segment 214, and a second protruding segment 215. The first connection segment 213 is coupled between the first protruding segment 214 and the second protruding segment 215. In some embodiments, the first ground element 210 substantially has a x-shape, but it is not limited thereto.

The second ground element 220 includes a second connection segment 223, a third protruding segment 224, and a fourth protruding segment 225. The second connection segment 223 is coupled between the third protruding segment 224 and the fourth protruding segment 225. In some embodiments, the second ground element 220 substantially has an inverted x-shape, but it is not limited thereto.

The third protruding segment 224 is disposed opposite to the first protruding segment 214. For example, the width W1 of the first protruding segment 214 may be greater than the width W3 of the third protruding segment 224. The first capacitor C1 is coupled between the first protruding segment 214 and the third protruding segment 224. In some embodiments, the first capacitor C1 has a first terminal coupled to a first connection point CP1 on a first edge 216 of the first protruding segment 214, and a second terminal coupled to a third connection point CP3 on a third edge 226 of the third protruding segment 224. However, the disclosure is not limited thereto. In alternative embodiments, based on different environments and design requirements, the width W1 of the first protruding segment 214 and the width W3 of the third protruding segment 224 are substantially equal to each other.

The fourth protruding segment 225 is disposed opposite to the second protruding segment 215. For example, the second protruding segment 215 may have a variable-width shape, and the maximum width W2 of the second protruding segment 215 may be greater than the width W4 of the fourth protruding segment 225. The second capacitor C2 is coupled between the second protruding segment 215 and the fourth protruding segment 225. In some embodiments, the second capacitor C2 has a first terminal coupled to a second connection point CP2 on a second edge 218 of the second protruding segment 215, and a second terminal coupled to a fourth connection point CP4 on a fourth edge 228 of the fourth protruding segment 225. However, the disclosure is not limited thereto. In alternative embodiments, based on different environments and design requirements, the width W2 of the second protruding segment 215 and the width W4 of the fourth protruding segment 225 are substantially equal to each other.

In some embodiments, the first protruding segment 214 has a first notch 217, the second protruding segment 215 has a second notch 219, the third protruding segment 224 has a third notch 227, and the fourth protruding segment 225 has a fourth notch 229. For example, the third notch 227 may be substantially aligned with the first notch 217, and both the first notch 217 and the third notch 227 may be disposed adjacent to the first capacitor C1. In addition, the fourth notch 229 may be substantially aligned with the second notch 219, and both the second notch 219 and the fourth notch 229 may be disposed adjacent to the second capacitor C2. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

In some embodiments, the first notch 217, the second notch 219, the third notch 227, and the fourth notch 229 as mentioned above can help to precisely position the first capacitor C1 and the second capacitor C2. In other words, they can reduce the difficulty of assembling the antenna structure 100, especially for the soldering process of each capacitor.

The main radiation element 110 is surrounded by the first ground element 210 and the second ground element 220. Specifically, the main radiation element 110 has a first end 111 and a second end 112. A feeding point FP is positioned at the first end 111 of the main radiation element 110. The second end 112 of the main radiation element 110 is coupled to the second ground element 220. The feeding point FP may be further coupled to a signal source 190. For example, the aforementioned signal source 190 may be an RF (Radio Frequency) module for exciting the antenna structure 100. In some embodiments, the main radiation element 110 includes a first portion 120 adjacent to the first end 111, a second portion 130, and a third portion 140 adjacent to the second end 112.

The first portion 120 of the main radiation element 110 is coupled to the feeding point FP. For example, the first portion 120 of the main radiation element 110 may substantially have an N-shape, but it is not limited thereto.

Among the main radiation element 110, the second portion 130 is coupled between the first portion 120 and the third portion 140. For example, the second portion 130 of the main radiation element 110 may substantially have a straight-line shape, but it is not limited thereto. In some embodiments, a first slot region 160 is defined between the first portion 120 and the second portion 130 of the main radiation element 110, and it belongs to an open slot.

The third portion 140 of the main radiation element 110 is coupled to the second connection segment 223 and the fourth protruding segment 225. For example, the third portion 140 of the main radiation element 110 may substantially have a variable-width slash shape, but it is not limited thereto. In some embodiments, a second slot region 170 is defined between the third portion 140 of the main radiation element 110 and the fourth protruding segment 225, and it belongs to another open slot. In some embodiments, an acute angle θ is formed between the third portion 140 of the main radiation element 110 and the second connection segment 223.

In some embodiments, the main radiation element 110 further includes a widening portion 150 coupled to the second portion 130, and the widening portion 150 substantially has a rectangular shape or a square shape. The widening portion 150 of the main radiation element 110 is adjacent to the first protruding segment 214. A first coupling gap GC1 may be formed between the widening portion 150 of the main radiation element 110 and the first protruding segment 214. In addition, the second portion 130 of the main radiation element 110 is adjacent to the first connection segment 213. A second coupling gap GC2 may be formed between the second portion 130 of the main radiation element 110 and the first connection segment 213.

The carrier element 260 is disposed in the metal cavity 270. For example, the carrier element 260 may be implemented with a plastic support element, which may substantially have a cuboid shape. Specifically, the carrier element 260 has a first surface E1, a second surface E2, a third surface E3, and a fourth surface E4. The first surface E1 of the carrier element 260 is configured to carry the main radiation element 110, the first protruding segment 214, the second protruding segment 215, the third protruding segment 224, the fourth protruding segment 225, the first capacitor C1, and the second capacitor C2. The metal cavity 270 is coupled to the first connection segment 213 and the second connection segment 223. Also, the metal cavity 270 is distributed over the second surface E2, the third surface E3, and the third surface E4 of the carrier element 260. In other words, the metal cavity 270 may include a front metal plane, a back metal plane, and a bottom metal plane. The bottom metal plane may be coupled between the front metal plane and the back metal plane. In alternative embodiments, the metal cavity 270 neither includes any left metal plane nor includes any right metal plane (i.e., each of the left and right sides of the metal cavity 270 may be an open side). However, the disclosure is not limited thereto. In alternative embodiments, the carrier element 260 is implemented with an FR4 (Flame Retardant 4) substrate, a PCB (Printed Circuit Board), or an FPC (Flexible Printed Circuit).

Figure 3:
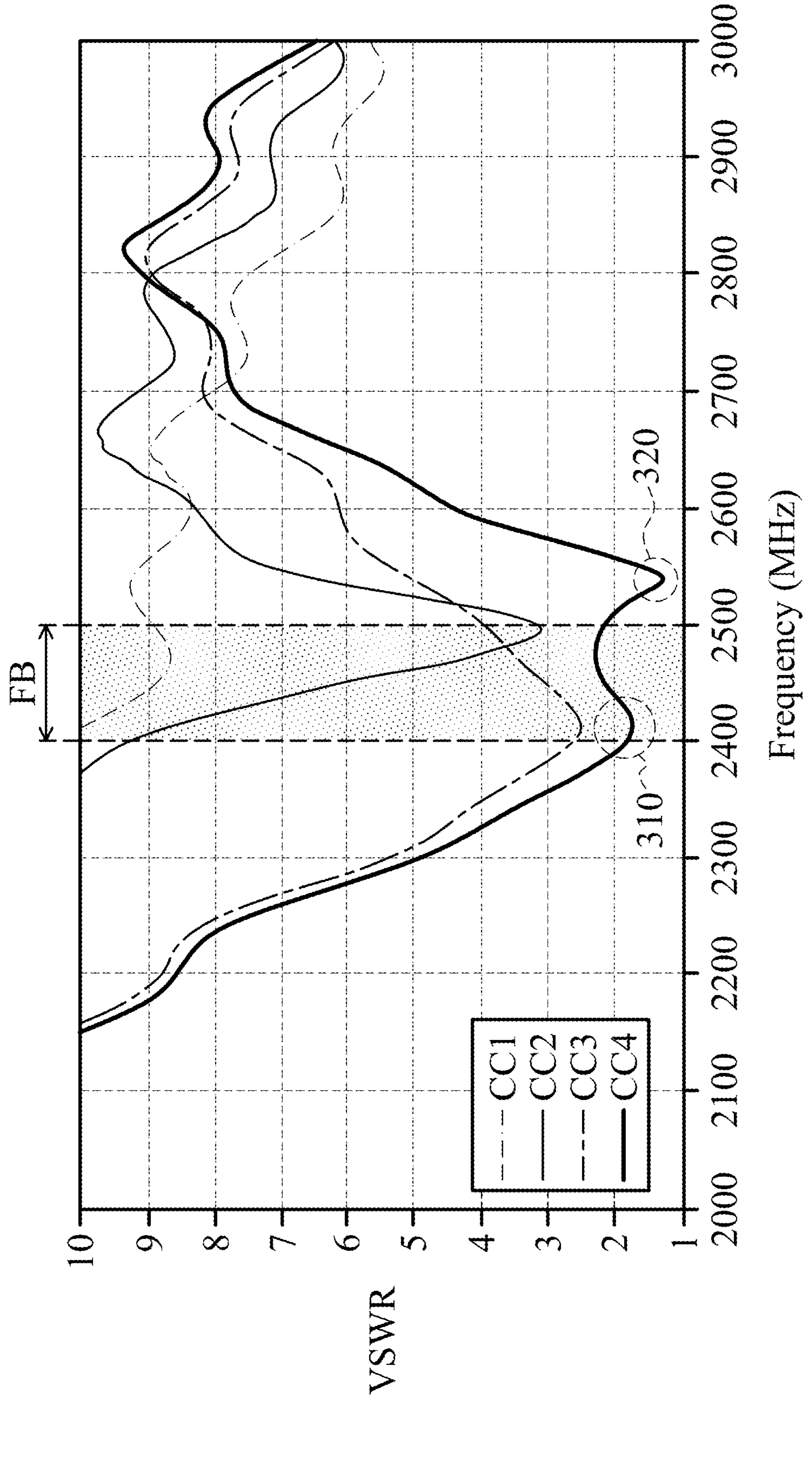
FIG. 3 is a diagram of VSWR (Voltage Standing Wave Ratio) of an antenna structure according to an embodiment of the disclosure.

FIG. 3 is a diagram of VSWR (Voltage Standing Wave Ratio) of the antenna structure 100 according to an embodiment of the disclosure. The horizontal axis represents the operational frequency (MHz), and the vertical axis represents the VSWR. As shown in FIG. 3, a first curve CC1 represents the operational characteristic of the antenna structure 100 without using any capacitors, a second curve CC2 represents the operational characteristic of the antenna structure 100 merely using the first capacitor C1, a third curve CC3 represents the operational characteristic of the antenna structure 100 merely using the second capacitor C2, and a fourth curve CC4 represents the operational characteristic of the proposed antenna structure 100 using both the first capacitor C1 and the second capacitor C2. According to the measurement of FIG. 3, the proposed antenna structure 100 can cover at least one operational frequency band FB. For example, the operational frequency band FB may be from 2400 MHz to 2500 MHz. Therefore, the antenna structure 100 of the disclosure can support at least the wideband operations of WLAN (Wireless Local Area Networks) 2.4 GHz and Bluetooth.

In some embodiments, the operational principles of the antenna structure 100 will be described as follows. The main radiation element 110 can be excited to generate the operational frequency band FB. Specifically, the operational frequency band FB is controlled by a main resonant mode 310 and an auxiliary resonant mode 320. The second capacitor C2 contributes to the main resonant mode 310. The first capacitor C1 contributes to the auxiliary resonant mode 320. According to practical measurements, the frequency shift of the main resonant mode 310 can be appropriately adjusted by changing the shapes and sizes of the first slot region 160 and the second slot region 170. The first coupling gap GC1 and the second coupling gap GC2 are used to increase the bandwidth of the operational frequency band FB. In addition, because the main radiation element 110 is surrounded by the first ground element 210, the second ground element 220, and the metal cavity 270, the radiation performance of the antenna structure 100 does not tend to be negatively affected by environmental noise or interference.

Figure 4:
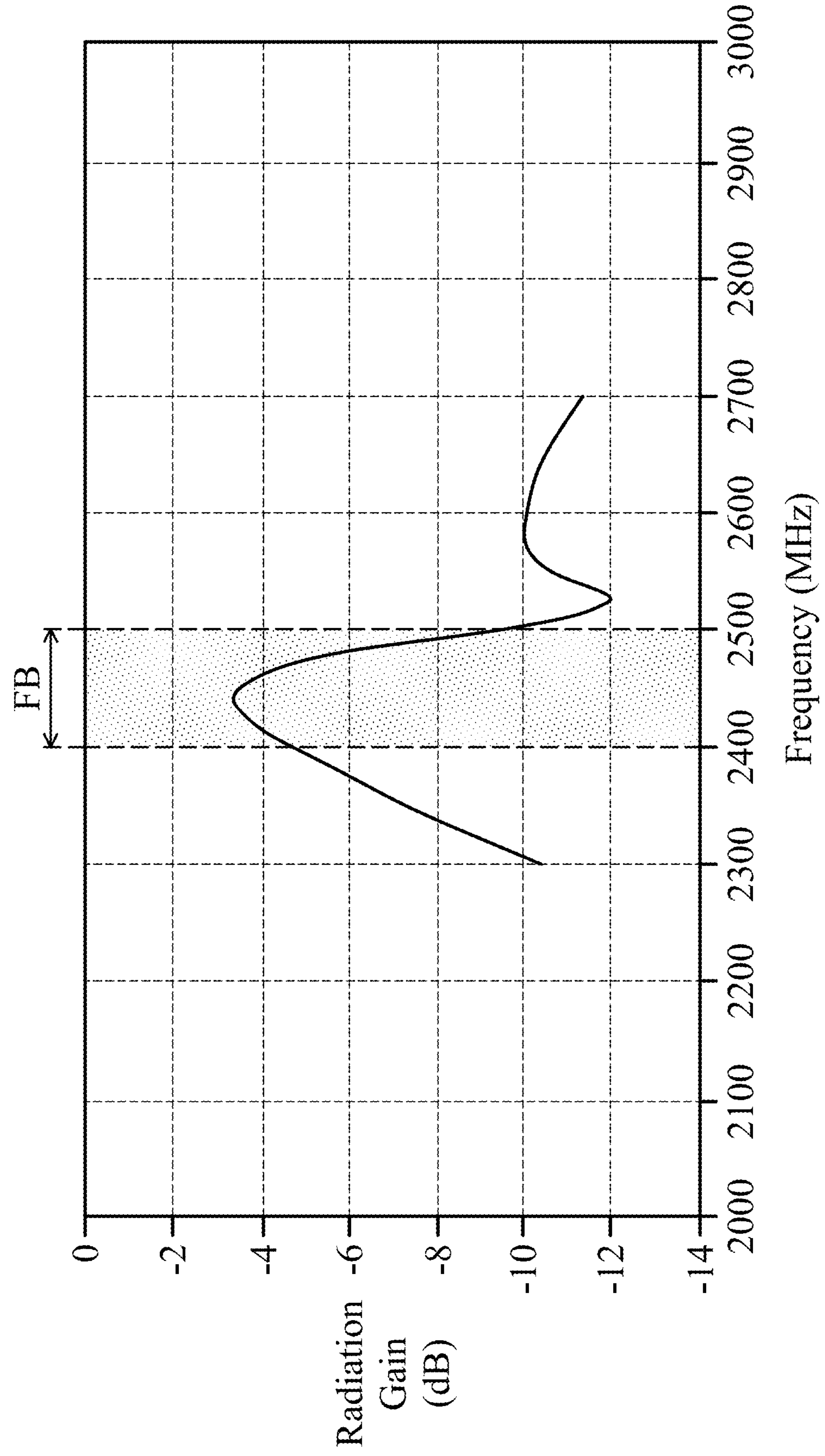
FIG. 4 is a diagram of radiation gain of an antenna structure according to an embodiment of the disclosure.

FIG. 4 is a diagram of radiation gain of the antenna structure 100 according to an embodiment of the disclosure. The horizontal axis represents the operational frequency (MHz), and the vertical axis represents the radiation gain (dB). According to the measurements of FIG. 4, the radiation gain of the antenna structure 100 can reach about −8 dB or higher within the aforementioned operational frequency band FB, and it can meet the requirements of practical applications of general mobile communication devices. It should be understood that the auxiliary resonant mode 320 almost has no corresponding radiation gain.

In some embodiments, the element sizes and element parameters of the antenna structure 100 will be described as follows. The length LM of the main radiation element 110 may be substantially equal to 0.25 wavelength (λ/4) of the operational frequency band FB of the antenna structure 100. The length LA of the first slot region 160 may be from 2 mm to 4 mm. The width WA of the first slot region 160 may be from 3 mm to 5 mm. The length LB of the second slot region 170 may be from 0 mm to 5 mm. The width WB of the second slot region 170 may be from 1 mm to 2.5 mm. The width of the first coupling gap GC1 may be from 1 mm to 2.5 mm. The width of the second coupling gap GC2 may be smaller than or equal to 1 mm. The length L1 of the first notch 217 may be from 0.1 mm to 0.3 mm. The length L2 of the second notch 219 may be from 0.1 mm to 0.3 mm. The length L3 of the third notch 227 may be from 0.1 mm to 0.3 mm. The length L4 of the fourth notch 229 may be from 0.1 mm to 0.3 mm. The distance D1 between the first connection segment 213 and the second connection segment 223 may be from 7 mm to 9 mm. The capacitance of the first capacitor C1 may be from 0.5 pF to 0.8 pF. The capacitance of the second capacitor C2 may be from 0.5 pF to 0.8 pF. The angle θ may be from 30 to 60 degrees, such as about 40, 45, or 50 degrees. The height H1 of the metal cavity 270 (or the distance between the first surface E1 and the third surface E3 of the carrier element 260) may be from 3 mm to 4 mm. The distance D2 between the third protruding segment 224 and the widening portion 150 of the main radiation element 110 may be from 1 mm to 2.5 mm. The above ranges of element sizes and element parameters are calculated and obtained according to many experiment results, and they help to optimize the operational bandwidth and impedance matching of the antenna structure 100, and also to minimize the noise and interference of the antenna structure 100.

In alternative embodiments, the antenna structure 100 is called as a Bluetooth antenna, but it is not necessary to include the aforementioned carrier element 260.

Figure 5:
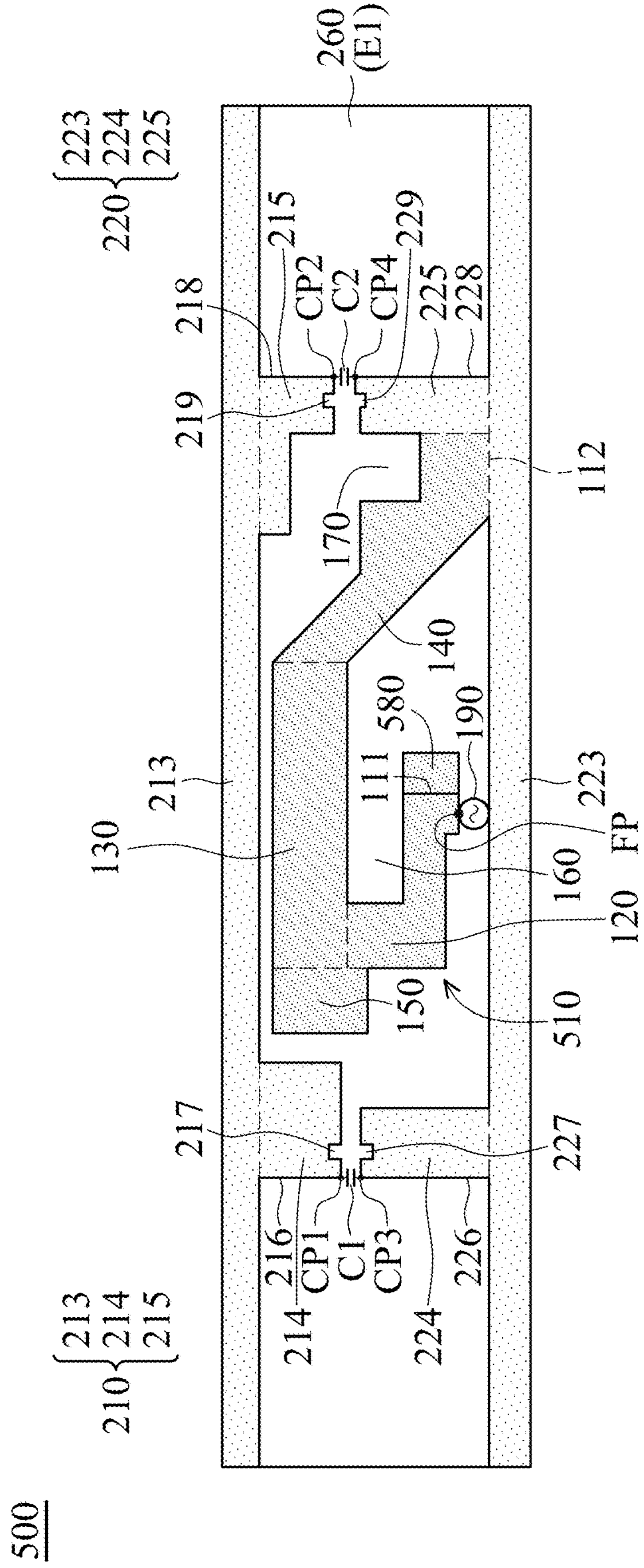
FIG. 5 is a top view of an antenna structure according to an embodiment of the disclosure.

FIG. 5 is a top view of an antenna structure 500 according to an embodiment of the disclosure. FIG. 5 is similar to FIG. 1. In the embodiment of FIG. 5, a main radiation element 510 of the antenna structure 500 further includes an extension portion 580, which is coupled to the first portion 120 of the main radiation element 510. For example, the extension portion 580 of the main radiation element 510 may substantially have another rectangular shape or another square shape. According to practical measurements, the extension portion 580 of the main radiation element 510 is also used to fine-tune the impedance matching of the antenna structure 500. Other features of the antenna structure 500 of FIG. 5 are similar to those of the antenna structure 100 of FIG. 1. Accordingly, the two embodiments can achieve similar levels of performance.

The disclosure proposes a novel antenna structure and a novel Bluetooth antenna. In comparison to the conventional design, the disclosure has at least the advantages of small size, wide bandwidth, high communication quality, and suppressing environmental noise. Therefore, the disclosure is suitable for applications in a variety of communication devices.

Note that the above element sizes, element shapes, element parameters, and frequency ranges are not limitations of the disclosure. An antenna designer can fine-tune these settings or values in order to meet specific requirements. It should be understood that the antenna structure and the Bluetooth antenna of the disclosure are not limited to the configurations depicted in FIGS. 1-5. The disclosure may merely include any one or more features of any one or more embodiments of FIGS. 1-5. In other words, not all of the features displayed in the figures should be implemented in the antenna structure and the Bluetooth antenna of the disclosure.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a main radiation element, having a feeding point;

a first ground element, comprising a first connection segment, a first protruding segment, and a second protruding segment;

a second ground element, comprising a second connection segment, a third protruding segment, and a fourth protruding segment, wherein the main radiation element is coupled to the second ground element, and wherein the main radiation element is surrounded by the first ground element and the second ground element;

a first capacitor, coupled between the first protruding segment and the third protruding segment;

a second capacitor, coupled between the second protruding segment and the fourth protruding segment;

a metal cavity, coupled to the first connection segment and the second connection segment; and a carrier element, disposed in the metal cavity, wherein the carrier element is configured to carry the main radiation element, the first protruding segment, the second protruding segment, the third protruding segment, the fourth protruding segment, the first capacitor, and the second capacitor;

wherein the main radiation element comprises a first portion, a second portion, and a third portion, wherein the first portion is coupled to the feeding point, the second portion is coupled between the first portion and the third portion, and the third portion is coupled to the second connection segment and the fourth protruding segment.

2. The antenna structure as claimed in claim 1, wherein a width of the first protruding segment is greater than that of the third protruding segment.

3. The antenna structure as claimed in claim 1, wherein a width of the second protruding segment is greater than that of the fourth protruding segment.

4. The antenna structure as claimed in claim 1, wherein the first protruding segment has a first notch, the second protruding segment has a second notch, the third protruding segment has a third notch, and the fourth protruding segment has a fourth notch.

5. The antenna structure as claimed in claim 4, wherein the third notch is substantially aligned with the first notch, and the fourth notch is substantially aligned with the second notch.

6. The antenna structure as claimed in claim 1, wherein the first capacitor has a first terminal coupled to a first connection point on a first edge of the first protruding segment, and a second terminal coupled to a third connection point on a third edge of the third protruding segment.

7. The antenna structure as claimed in claim 1, wherein a capacitance of the first capacitor is from 0.5 pF to 0.8 pF.

8. The antenna structure as claimed in claim 1, wherein the second capacitor has a first terminal coupled to a second connection point on a second edge of the second protruding segment, and a second terminal coupled to a fourth connection point on a fourth edge of the fourth protruding segment.

9. The antenna structure as claimed in claim 1, wherein a capacitance of the second capacitor is from 0.5 pF to 0.8 pF.

10. The antenna structure as claimed in claim 1, wherein a first slot region is defined between the first portion and the second portion of the main radiation element.

11. The antenna structure as claimed in claim 1, wherein a second slot region is defined between the third portion of the main radiation element and the fourth protruding segment.

12. The antenna structure as claimed in claim 1, wherein an acute angle is formed between the third portion of the main radiation element and the second connection segment.

13. The antenna structure as claimed in claim 1, wherein the main radiation element further comprises a widening portion coupled to the second portion.

14. The antenna structure as claimed in claim 13, wherein a first coupling gap is formed between the widening portion of the main radiation element and the first protruding segment, and wherein a width of the first coupling gap is from 1 mm to 2.5 mm.

15. The antenna structure as claimed in claim 1, wherein a second coupling gap is formed between the second portion of the main radiation element and the first connection segment, and wherein a width of the second coupling gap is smaller than or equal to 1 mm.

16. The antenna structure as claimed in claim 1, wherein the main radiation element further comprises an extension portion coupled to the first portion.

17. The antenna structure as claimed in claim 1, wherein the antenna structure covers an operational frequency band from 2400 MHz to 2500 MHz.

18. The antenna structure as claimed in claim 17, wherein a length of the main radiation element is substantially equal to 0.25 wavelength of the operational frequency band.

19. A Bluetooth antenna, comprising:

a main radiation element, having a feeding point;

a first ground element, comprising a first connection segment, a first protruding segment, and a second protruding segment;

a second ground element, comprising a second connection segment, a third protruding segment, and a fourth protruding segment, wherein the main radiation element is coupled to the second ground element, and wherein the main radiation element is surrounded by the first ground element and the second ground element;

a first capacitor, coupled between the first protruding segment and the third protruding segment;

a second capacitor, coupled between the second protruding segment and the fourth protruding segment; and a metal cavity, coupled to the first connection segment and the second connection segment;

wherein the main radiation element comprises a first portion, a second portion, and a third portion, wherein the first portion is coupled to the feeding point, the second portion is coupled between the first portion and the third portion, and the third portion is coupled to the second connection segment and the fourth protruding segment.

* * * * *